United States Patent [19]

Loritz et al.

[11] Patent Number: 5,748,441
[45] Date of Patent: May 5, 1998

[54] NOTEPAD COMPUTER HAVING AN INTEGRATED VIDEO CAMERA

[75] Inventors: Axel Loritz, Tutzing; Stefan Hillenmayer, Munich, both of Germany

[73] Assignee: Siemens Aktiengesellschaft, Munich, Germany

[21] Appl. No.: 660,428

[22] Filed: Jun. 7, 1996

[30] Foreign Application Priority Data

Jun. 22, 1995 [DE] Germany .................. 29510170.9 U

[51] Int. Cl.[6] .................................................. G06F 1/16
[52] U.S. Cl. .......................... 361/683; 345/169; 345/905; 348/552
[58] Field of Search .............................. 361/680, 681, 361/683, 686; 345/169, 173, 174, 179, 905, 901; 364/708.1; 16/386; 348/552; G06F 1/16

[56] References Cited

U.S. PATENT DOCUMENTS

D. 363,471 10/1995 Shima et al. .................. D14/106
5,475,441 12/1995 Parulski et al. .................. 348/552
5,550,754 8/1996 McNelley et al. .................. 364/514 A

FOREIGN PATENT DOCUMENTS 08022343 1/1996 Japan.

*Primary Examiner*—Lynn D. Feild
*Attorney, Agent, or Firm*—Hill, Steadman & Simpson

[57] ABSTRACT

A stylus-oriented small notepad computer is provided. The notepad computer has a flat input/output display screen that can be operated by an electrical input stylus. The screen is fastened on the cover surface of a flat rectangular computer housing inside a flat frame. A hinged cover that covers the flat display screen is pivotably connected with an edge of the computer housing. A video camera is also housed inside the notepad computer. For this purpose, the pivot axle is constructed as a tube-shaped articulated axle having an interior to accept the video camera. The video camera is connected with a gooseneck to allow different positions of the camera to acquire various video images.

15 Claims, 3 Drawing Sheets

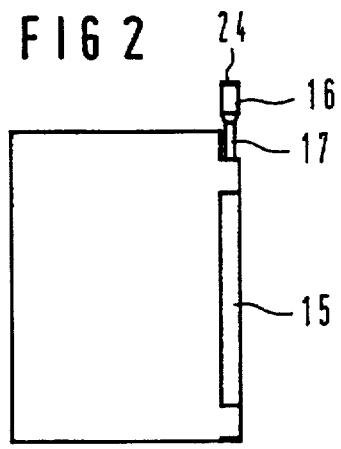
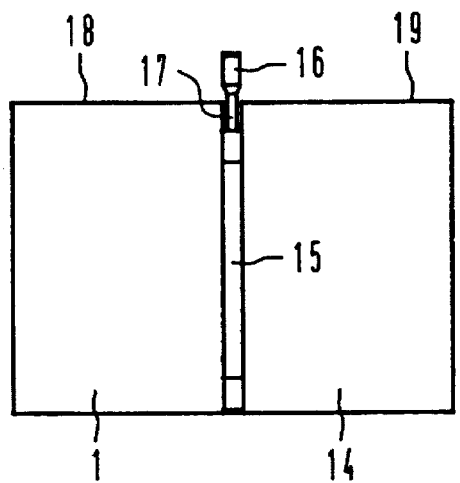
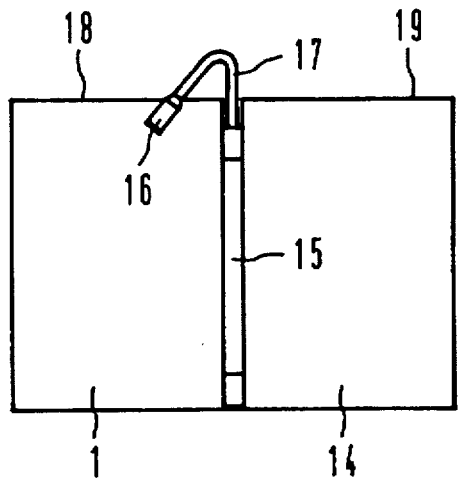

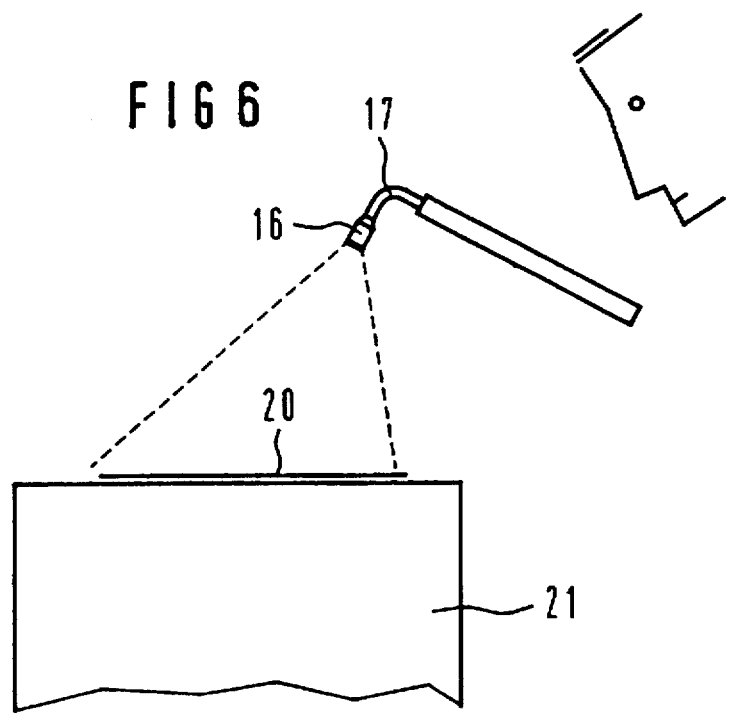
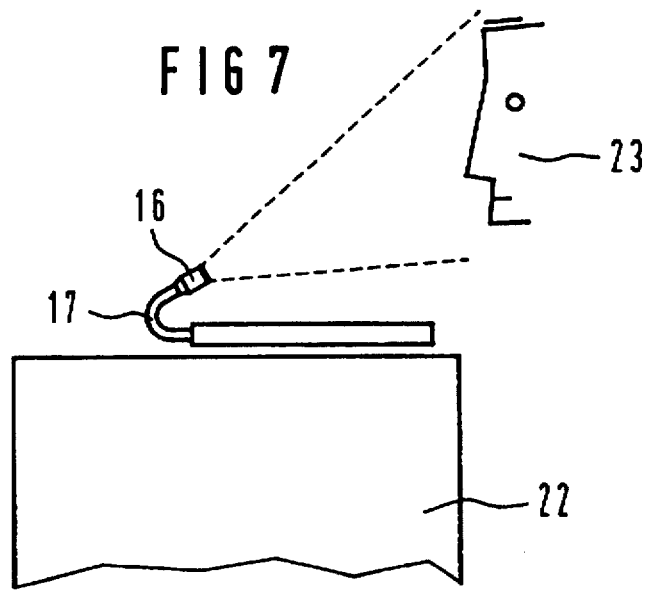

NOTEPAD COMPUTER HAVING AN INTEGRATED VIDEO CAMERA

BACKGROUND OF THE INVENTION

1. Field of the Invention

The present invention is directed generally to portable computers and more specifically to a small computer in notepad form having a flat input/output display screen that can be operated by means of an electrical input stylus and includes an integrated video camera. The screen is fastened on the cover surface of a flat rectangular computer housing inside a flat frame, and has a hinged cover that is pivotably connected with one edge of the computer housing that covers the flat display screen.

2. Description of the Related Art

The development of portable computers came about as a result of the idea, obvious in itself, of making the devices increasingly smaller, lighter and cheaper, but also more powerful. Such improvements are the result of rapid progress in increasing the degree of integration or the packing density of integrated circuits. This development led from what are known as laptops, in a briefcase size, to what are known as notebook computers, in which the arithmetic module, together with the housing containing the keyboard and the LCD display provided in a cover, occupies only the dimensions of a notebook.

This trend continues further with what are known as notepads, whereby the new type of portable small computers dispenses with the input keyboard, which takes up a relatively large amount of space. The input of data and commands occurs directly on the display screen by means of a hand-operated special input stylus. The particular advantage of this stylus-oriented arithmetic module lies in the mobile acquisition of data, especially for activities that previously had to be carried out by marking forms and acquisition sheets.

Known stylus-oriented devices also make use of standard interfaces via which the connection to different peripheral devices or to central data processing units is possible. Immediate data processing and transmission on location would indeed be highly useful, but considerable problems must be overcome. The problems are due not only to the weight of the other devices that would have to be brought along, such as a modem, a printer or the like, but also to the energy requirement connected therewith.

Attempts have been made to design a stylus-oriented small computer in notepad form in such a way that, beyond the pure acquisition of data, there is also the possibility of data processing and coupling to external communications systems. In addition, integrating further communications systems, without significantly affecting the size and weight of the device has been attempted.

A notepad of this sort is known from DE-GM 92 11 270. A guide strip running alongside an edge of the flat frame, supported on both sides on the flat frame, is provided next to the flat display screen. On the underside of the guide strip and/or on the area of the computer housing covered by the guide strip, a scanner and/or printing apparatus is arranged for processing individual pages that can be introduced via a lateral input slot. Furthermore, the edge of the computer housing lying opposite the scanner and/or printer apparatus is pivotably fastened to the hinged cover that covers the flat display screen, which is formed in such a way that in the closed state it terminates flush and at the same level with the guide strip. On the inner side of the hinged cover, a solar cell surface is provided. On the base surface of the computer housing, at least one battery for internal power supply that can be plugged into a tub-type or groove-type recess, or a mobile telephone, is detachably provided. One or several peripheral devices, in particular a mobile telephone are integrated in a stylus-oriented small computer system. This integration provides the advantage in mobile operation, that the entire device can be used beyond pure data processing, for both data processing and for communications purposes as needed. The increased power requirement connected therewith is covered by the solar cell surface provided in the hinged cover, which supports the battery.

SUMMARY OF THE INVENTION

In order to enable the transmission of photocopies of documents, persons or objects, a video camera is additionally provided in the notepad computer. The video camera is integrated into the device in such a way that the outer dimensions of the notepad are altered only slightly. To this end, the present invention provides, in an embodiment, a pivot axle formed as a tube-shaped articulated axle to serve for mounting the video camera. Such a tube-shaped articulated axle provides a receptacle space for the video camera. The space requirement is minimal when currently known, relatively small video cameras are used. Video exposures can thereby be produced that can be transmitted via wireless paths.

In order to optimize the handling of the camera, the video camera can be connected with a flexible gooseneck. The gooseneck, which is mounted with the camera inside the articulated axle when the camera is not in use, provides for arbitrary positionings of the video camera. Thus, the video camera can be rotated so that with the notepad laid on a surface, the user can be photocopied without the requirement of a correcting adjustment of the camera. Furthermore, a lens cover made of magnetic material can be used that covers the camera lens in an unused state. When the camera is in use, this cover is fastened laterally to the camera and clings there due to its magnetic properties.

An exemplary embodiment of the present invention will be further described with reference to the figures as explained below.

BRIEF DESCRIPTION OF THE DRAWINGS

FIG. 2 illustrates an embodiment of the closed notepad of the present invention with a partially extended video camera.

FIG. 3 illustrates an embodiment of the opened notepad of the present invention with a partially extended video camera in a top view.

FIG. 4 is a top view of the exemplary embodiment according to FIG. 3 of the present invention.

FIG. 5 illustrates an embodiment of the opened notepad of the present invention with the video camera bent in a downward position.

FIG. 6 illustrates a first possibility for use of the video camera of the present invention with documents.

FIG. 7 illustrates a further possibility for use of the video camera of the present invention with the camera directed onto a user.

DETAILED DESCRIPTION OF THE PREFERRED EMBODIMENTS

Figure 1:
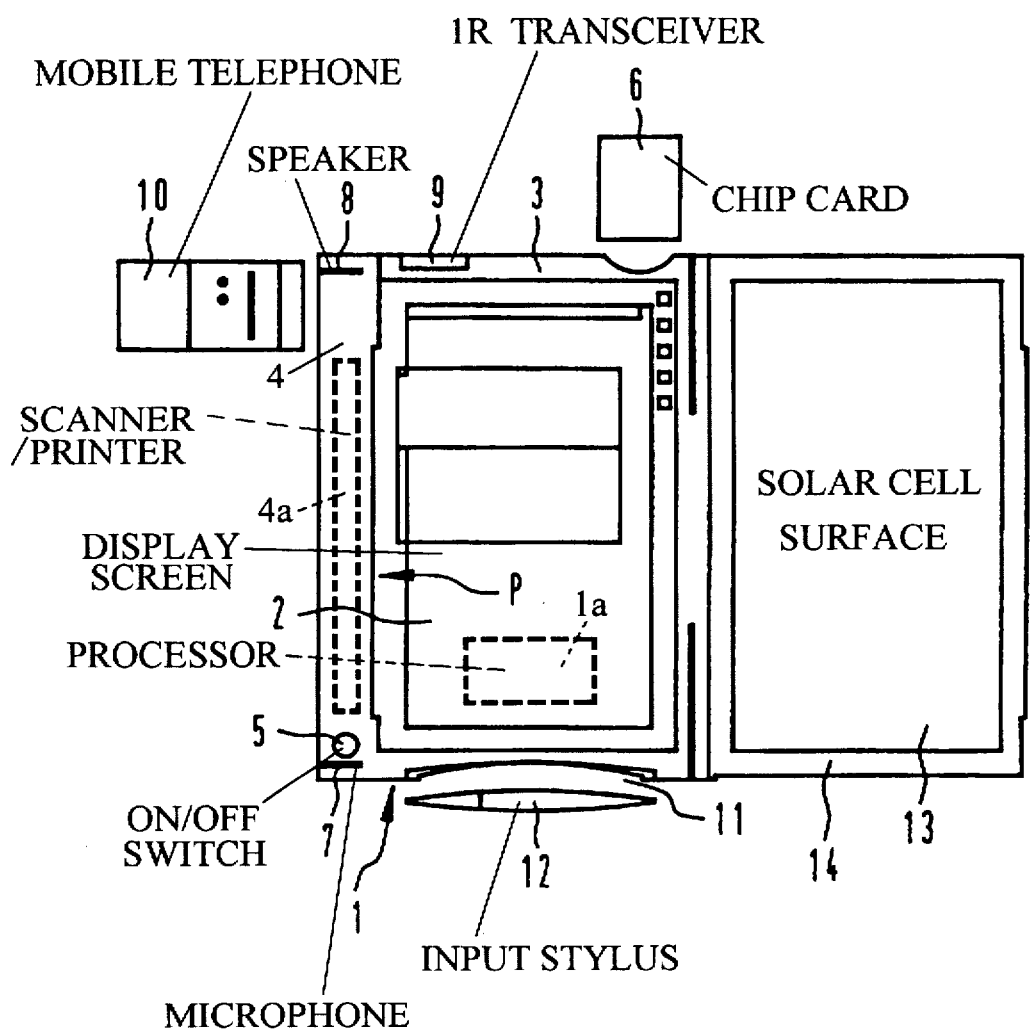
FIG. 1 is a schematic top view of an embodiment of a stylus-oriented small computer of the present invention referred to as a notepad having an integrated video camera.

FIG. 1 shows a stylus-oriented small computer in a schematically represented top view. This notepad consists of a rectangular computer housing 1 containing a processor 1a. The computer housing 1 has a cover surface with a liquid crystal flat display screen 2 fastened inside a flat frame 3. A guide strip 4 runs laterally adjacent to the flat display screen 2 along the left edge of the flat frame 3 and is supported at both ends on the flat frame 3. In the area of this guide strip 4, a scanner and/or printing apparatus 4a are arranged. The individual pages to be scanned or printed, for example, in DIN A4 size, are fed via a lateral input slot (see arrow P) to the scanner and/or printing apparatus 4a.

Optoelectrical scanning means for the scanning apparatus is usefully located on the lower side of the guide strip 4, while the printer apparatus, as well as the drive means for the paper transport, are housed opposite in the computer housing 1. An on/off switch 5 is further provided on the guide strip 4. The switch 5 is preferably constructed as a push-button switch. The push-button switch 5 has a button head which can provide an optical scanner head for fingerprint scanning as an-access control to the computer system. The actual access control occurs via a chip card 6 whose associated card reader, indicated in FIG. 1 by a card input slot, is integrated into the computer housing 1.

A microphone 7 and a loudspeaker 8, for speech input and audio output, are further built into the guide strip 4. In addition, an infrared transmitter and/or receiver means 9 for wireless data transmission is integrated on the upper edge of the computer housing 1.

As a further communications means, a mobile telephone 10 is provided. The telephone 10 can be laterally retracted at the base surface of the computer housing 1 into a groove-type recess provided there. On the lower edge of the flat frame 3, a trough-type receptacle means 11 is provided, in which the input stylus 12 intended for data input on the flat display screen 2 is held at both ends by slot-type clamp elements.

On the base surface of the computer housing 1, a further tub-type recess (not visible in the drawing) is present in order to accept a battery for supplying power to the notepad and to the components integrated into the notepad. A solar cell surface 13 supports the battery. The solar cell surface 13 is fastened on the inner surface of a hinged cover 14. The hinged cover 14 is provided with bearings on the computer housing 1 for rotation. This hinged cover 14 is fastened to the longitudinal edge of the computer housing 1 lying opposite the guide strip 4. In the closed state, the hinged cover 14 serves as mechanical support for the flat display screen 2. Moreover, the hinged cover 14 is constructed so that in the closed state, it lies flush with and on the same level with the guide strip 4.

FIG. 2 illustrates that the computer housing 1 is connected with the hinged cover 14 via an articulated axle 15. This tube-shaped articulated axle provides for the mounting of a video camera 16. In FIG. 2, the video camera 16 is partially drawn out of the articulated axle 15. A gooseneck 17 is connected with the video camera 16. The gooseneck 17 enables arbitrary positionings of the video camera 16. In the retracted state of the video camera 16 and gooseneck 17, in which it terminates flush with the adjacent edges 18 and 19 of the computer housing 1 and of the hinged cover 14, it is closed by a magnetic lens cover 24 (see FIG. 2). In operation, this lens cover 24 is laterally attached to the video camera 16 and clings there magnetically.

In FIGS. 3 and 4, the video camera 16 is extended at an angle to the notepad surface, while in FIG. 5 it is bent. As can be seen in FIG. 6, documents 20 located on a surface 21 can be filmed by the video camera 16 bent approximately perpendicular to the notepad surface. Given a notepad lying on a surface 22, the gooseneck 17 can be bent so that a user 23 is optimally acquired by the video camera 16 to generate a video image of the user 23.

Although other modifications and changes may be suggested by those skilled in the art, it is the intention of the inventors to embody within the patent warranted hereon all changes and modifications as reasonably and properly come within the scope of their contribution to the art.

We claim:

1. A notepad computer comprising:

a housing having a flat surface arranged inside a flat frame;

a processor in said housing;

a flat input/output display screen arranged on the flat surface of the housing;

a cover constructed and arranged to cover the display screen when closed;

an articulated pivot axle connecting the cover to the housing along an edge of the housing, the axle having a cavity therein; and a video camera retractably mounted in the cavity of the articulated pivot axle, for when removed from said cavity, generating video signals comprising an image of an object in a filed of view of said video camera for supply to said processor.

2. The notepad computer according to claim 1, further comprising:

a flexible gooseneck connected to the video camera.

3. The notepad computer according to claim 1, further comprising:

a magnetic lens cover for the video camera.

4. The notepad computer according to claim 1, further comprising an electrical input stylus to operate the display screen.

5. The notepad computer according to claim 1, further comprising:

a paper guide strip located laterally adjacent to the display screen along an edge of the flat frame.

6. The notepad computer according to claim 5, further comprising:

a scanner device located in the housing at said guide strip for scanning documents to produce input information to said processor.

7. The notepad computer according to claim 5, further comprising:

a printing device located in the housing at said guide strip for printing documents compiled by said processor.

8. The notepad computer according to claim 1, further comprising:

an on/off switch having a button head;

means for scanning a fingerprint as an access control to the computer connected to the button head.

9. The notepad computer according to claim 1, further comprising:

an access control means incorporated in the housing.

10. The notepad computer according to claim 9, wherein the access control means is a chip card and an associated card reader integrated into the housing.

11. The notepad computer according to claim 1, further comprising:

a microphone and a speaker connected to the housing for audio inputs, and outputs respectively to and from said processor.

12. The notepad computer according to claim 1, further comprising:

an infrared transmitter/receiver means for wireless data transmission to and from said processor integrated into the computer housing.

13. The notepad computer according to claim 1, further comprising:

a mobile telephone connected to the housing for entering information into said processor.

14. The notepad computer according to claim 1, further comprising:

a solar cell surface located on an inner surface of the cover for generating power for all components of said notepad computer.

15. The notepad computer according to claim 4, further comprising:

means for holding the electrical input stylus connected to the housing.

* * * * *